Sept. 8, 1936.    J. GOGAN    2,053,472
HARDNESS TESTING MACHINE
Filed Jan. 7, 1935    2 Sheets-Sheet 1
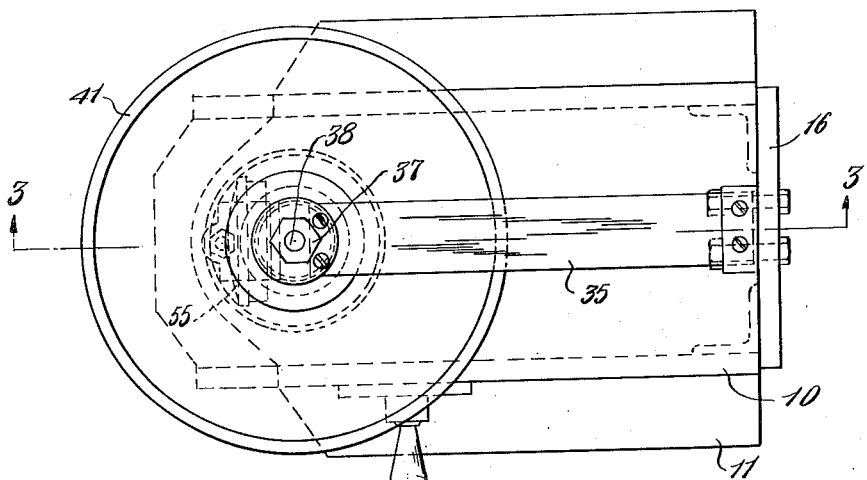
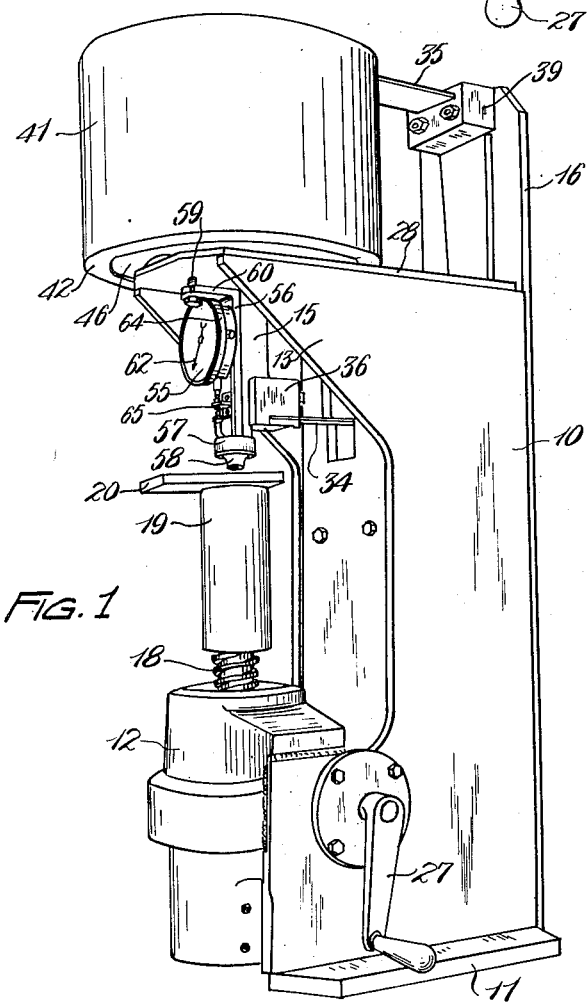
INVENTOR.
JOSEPH GOGAN
BY
Kwis Hudson & Kent
ATTORNEYS Sept. 8, 1936.　　　　J. GOGAN　　　　2,053,472
HARDNESS TESTING MACHINE
Filed Jan. 7, 1935　　　2 Sheets-Sheet 2

INVENTOR.
JOSEPH GOGAN
BY
Kwis Hudson & Kent
ATTORNEYS

Patented Sept. 8, 1936

2,053,472

UNITED STATES PATENT OFFICE 2,053,472

HARDNESS TESTING MACHINE

Joseph Gogan, Lakewood, Ohio

Application January 7, 1935, Serial No. 667

8 Claims. (Cl. 265—12)

This invention relates to hardness testing machines and, as its principal object, aims to provide an improved hardness testing machine of compact and simplified construction and with which the hardness of individual metal bodies can be rapidly and accurately tested.

Another object of the invention is to provide an improved hardness testing machine having a weighted test spindle and embodying means for causing the load of the weighted spindle to press a penetrator into a specimen.

Another object of the invention is to provide an improved hardness testing machine having a gravity weight normally supported on the machine with its center of gravity substantially in line with the axis of a test spindle, and wherein means is provided for causing the gravity weight to be lifted and its load directly applied to the spindle for pressing a penetrator into the specimen.

A further object of the invention is to provide an improved testing machine, of the type referred to, wherein means is provided for causing the test spindle to be lifted by force transmitted through the specimen and the penetrator, whereby the gravity weight is directly engaged and lifted by the spindle to cause the load of the weight to press the penetrator into the specimen.

A further object of the invention is to provide an improved hardness testing machine having a weighted test spindle provided with a penetrator, and a movable support for bringing a specimen into lifting engagement with the penetrator and spindle, and wherein a gravity weight normally supported on the frame of the machine is adapted to be directly engaged and lifted by the spindle to cause an increased test load to be applied to the penetrator.

Other objects and advantages of the invention will be apparent from the following description and the accompanying drawings, wherein Fig. 1 is a perspective view of a testing machine constructed according to my invention;

Fig. 2 is a top plan view of the machine; and

Figure 3:
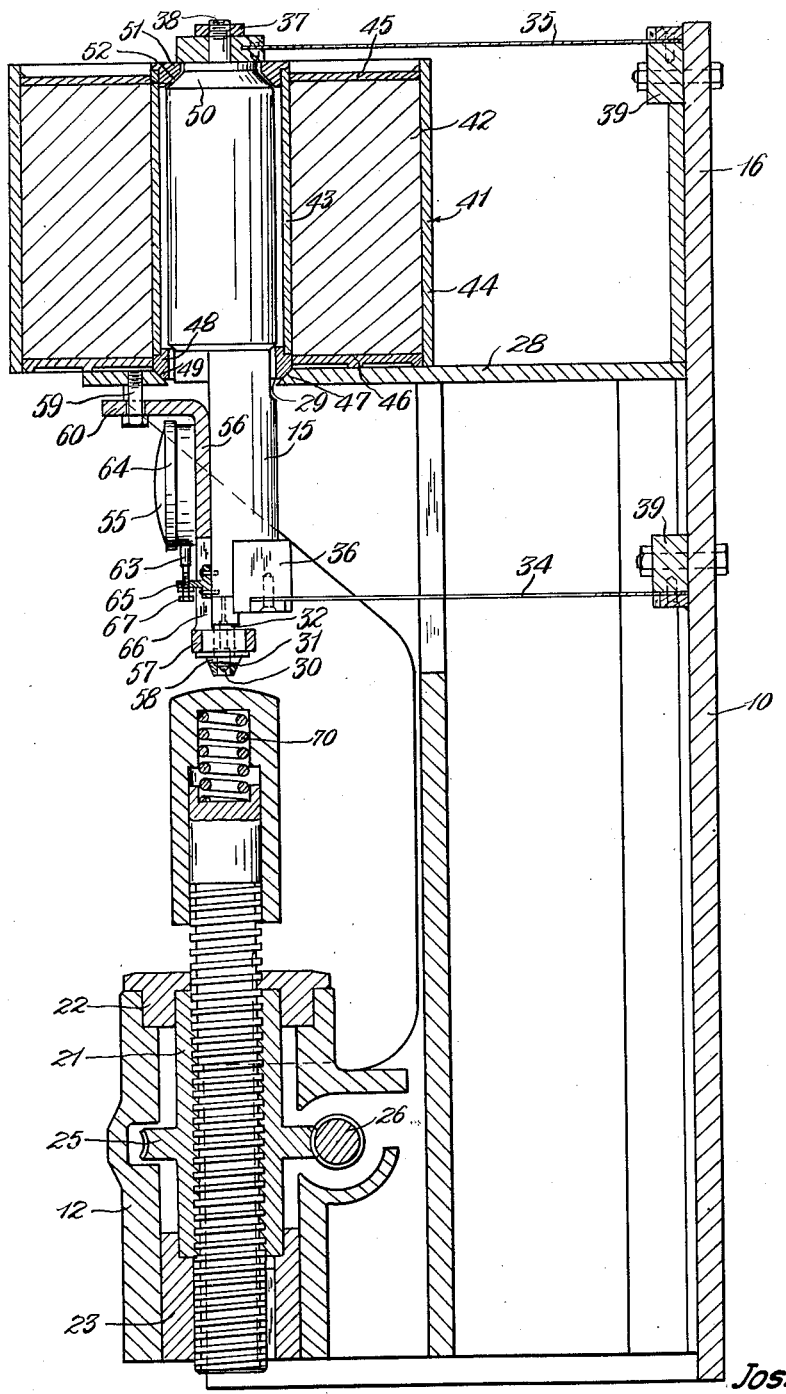
Fig. 3 is a sectional elevation of the machine taken on the line 3—3 of Fig. 2.

A more detailed description of the invention will now be made by referring to the accompanying drawings, wherein I have illustrated what I now regard to be a preferred form of my improved machine for testing the hardness of individual bodies. Before proceeding with such more detailed description, however, it should be understood that the invention may be embodied in various other machines and apparatus than that herein disclosed.

The testing machine shown in the drawings is provided with a frame 10 which may be suitably constructed from metal, such as by casting or by welding together previously formed metal parts. The frame may be provided with a base 11 upon which the machine may be stood on a work bench or other suitable foundation. The frame of the machine may also have a projecting lower part 12 upon which a work supporting means may be mounted, and a projecting upper part 13 upon which a test spindle 15 and other parts of the mechanism may be mounted. The projecting portion 13 may be in the form of a bracket, as shown in Fig. 1, and is arranged above and in line with the lower projection 12. The frame may also have a portion 16 extending upwardly above the bracket part 13 and which constitutes a part of the spindle mounting means to be explained hereinafter.

The work supporting means associated with the lower projecting part 12 of the frame may comprise a vertical screw 18, and an anvil 19 carried on the upper end of the screw and upon which a test piece or specimen 20 may be supported. The screw 18 extends into a nutlike member 21 which is rotatably mounted in the projecting part 12 of the frame.

The member 21 is suitably supported in the frame by bearing members 22 and 23, and may be provided intermediate its ends with a worm wheel 25 with which a driving worm 26 cooperates for causing rotation of the screw. The worm 26 is suitably mounted in the frame 10 and may be driven by any appropriate means such as the hand crank 27. From the arrangement just described, it will be seen that by rotation of the hand crank the screw 18 can be moved up or down to raise or lower the anvil 19 with the specimen 20 thereon.

The spindle 15 of the testing mechanism is preferably arranged in vertical relation with its axis extending in line with the axis of the screw 18. The bracket part 13 of the frame may include a top plate or table 28 having an opening 29 through which the vertical test spindle 15 extends. A penetrator which is preferably though not necessarily, in the form of a diamond point 30, is associated with the lower end of the spindle and is adapted to be pressed into the specimen 20. In this instance the penetrator is carried by the spindle, but this is not necessary and if desired the penetrator may be arranged to engage the specimen without being connected to the spindle. The diamond point may be mounted on a holder or head 31 which may be secured to the spindle by having a stem portion extending into an opening of the spindle and retained therein by any suitable fastening means.

As one of the features of my invention, I construct the spindle 15 as a weighted spindle so that it will of its own weight press the penetrator 30 against the specimen with a definite load. To the attainment of this end, the spindle may be constructed with an increased body of metal contained therein, as shown in Fig. 3 of the drawings. Although the spindle may be constructed of any desired form or shape, I prefer to construct this member of elongated form, as shown in Fig. 3, and to mount the spindle member for substantially frictionless movement relative to the frame by means of strips of flexible metal 34 and 35. These strips are arranged in substantially parallel relation so that vertical movement of the spindle may take place by a flexing of the strips and so that such vertical movement of the spindle will be a substantially straight line movement.

The strips 34 and 35 are connected to the spindles respectively adjacent the lower and upper ends thereof, and the opposite ends of the strips are connected to the frame of the machine. The connection between the lower strip 34 and the lower end of the spindle may be made by connecting the strip end to a block 36 which is in turn connected to the lower portion of the spindle. The corresponding end of the upper strip 35 may be connected to the upper portion of the spindle by having the strip end connected to a plate member or washer 37 which is in turn mounted upon a reduced stem portion 38 of the spindle. The opposite ends of the strips may be connected to the frame in a similar manner by having the strip ends connected to blocks 39 which are in turn secured to the frame. The upwardly extending frame part 16 provides a part to which the outer end of the upper strip 35 may be conveniently connected.

As mentioned above, the test spindle 15 is weighted for the purpose of supplying a test load to the penetrator 30, but this load as applied by the spindle itself, is only a preliminary or minor load which may be employed to cause the penetrator 30 to break through dirt or other foreign matter on the surface of the specimen, but which may also be used as a means of testing the surface hardness or characteristic of the specimen. For supplying an increased or major load to the penetrator, I provide as another feature of my invention, a gravity weight 41 which is normally supported upon the table portion 28 of the frame bracket 13 but which is adapted to be directly engaged and picked up by the spindle 15 to cause the load of the weight to act on the penetrator.

The weight 41 may be made of any suitable size or shape depending upon the construction of the machine and the character of test to be made. In this instance I show the weight as comprising a housing or shell which contains a body of lead 42 or any other suitable concentrated material. The shell may be constructed from coaxially disposed sections 43 and 44 of pipe, and annular end plates 45 and 46 secured to the pipe sections. The pipe section 44 forms the outer wall of the retaining shell for the body of material 42, and the inner pipe section 43 provides a tubular central opening through the weight to accommodate the weighted spindle 15.

For centering the weight 41 with respect to the axis of the spindle 15 and the axis of the screw 18, I may provide the table 28 of the frame bracket with an annular tapered surface 47 adjacent the opening 29, and may also provide the lower end of the weight with a bushing 48 having a tapered annular portion 49 which corresponds with and cooperates with the tapered portion 47 of the table.

To enable the test spindle 15 to engage and pick up the weight 41 when the spindle is lifted, I provide the spindle with an annular tapered surface 50 adjacent its upper end, and also provide the upper end of the weight with a bushing 51 having a tapered surface 52 which is engaged by the tapered surface of the spindle when the latter is raised. The spindle may be prevented from dropping downwardly through the central opening of the weight 41 by means of the washer 37 which is of a larger diameter than the opening of the bushing 51.

For measuring the extent to which the penetrator 30 is pressed into the specimen, I provide a gauge or indicator 55 which is mounted on a movable support or bracket 56. The bracket 56 is coextensive with the lower portion of the test spindle 15 and is provided at its lower end with a ringlike part 57 through which the test spindle extends. A cup-like contact member 58 is mounted in the ring part 57 and is disposed around the holder 31 of the penetrator for engagement with the specimen, whereby the weight of the gauge bracket may be supported directly on the specimen.

The gauge bracket may be prevented from dropping out of cooperating relation with the test spindle by providing means for limiting the downward movement of the bracket. Such means is provided in this instance in the form of a screw 59 mounted in the table 28 so as to extend through an opening of the laterally extending part 60 of the gauge bracket. The stem of the screw forms a guide upon which the upper portion of the gauging bracket is movable and the head of the screw forms an abutment which supports the weight of the gauge bracket when the latter is at the lower limit of its movement.

The gauge 55 may be of any suitable construction and may have a graduated dial, and a movable pointer 62 which is normally moved in a registering direction by means of a spring contained in the gauge housing. Such movement of the pointer by the spring is permitted only by corresponding movement of the gauge stem 63 in an outward direction with respect to the gauge housing. The pointer of the gauge may be moved in the reverse direction by movement of the gauge stem 63 inwardly with respect to the gauge housing. The gauge is preferably also provided with a movable rim 64 having operative connection with the dial which carries the graduations, so that by manually rotating the rim 64, the dial of the gauge may be adjusted or set with respect to a given position of the pointer 62.

For establishing an operative connection between the gauge stem 63 and the test spindle 15, I provide gauge actuating means in the form of a bracket 65 which is secured to the spindle 15 and projects through an opening 66 of the gauge support. A screw 67 adjustably mounted in the bracket 65 forms a contact member for engagement with the gauge stem 63.

In the operation of my improved testing machine, a piece to be tested, such as the specimen 20, is rested upon the anvil 19 and by rotating the crank 21 the screw 18 and the anvil 19 are raised to move the specimen upwardly into engagement with the contact member 58 of the gauge support, and into engagement with the penetrator 30 of the test spindle 15. The engagement of the penetrator with the contact member of the gauge support causes the gauge support to be lifted so that this member will rest upon the specimen during the test being made. With the gauge support resting upon the specimen during the test, it will be seen that any deflection of the specimen, such as penetration thereof by the anvil, will not cause error in the gauge reading because the gauge will at all times follow the specimen. Similarly, this provision for movement of the gauge support to follow the specimen, will eliminate error which might otherwise result from stretch or deflection occurring in the frame or other parts of the apparatus.

Continued upward movement of the specimen by the anvil causes the penetrator 30 to be engaged and lifted by the specimen. The lifting of the spindle 15 causes the load provided by the weight of the spindle to be applied to the penetrator which causes the penetrator to move through the decarburized surface of the specimen and through any foreign matter adhering to the specimen. When the test spindle 15 has been thus lifted so that the washer 38 moves away from the bushing 51, the weight of the spindle has been fully applied to the penetrator and when the gauge pointer comes to rest the operator then knows that the preliminary or minor load has been applied. The reading of the gauge may be noted at this time and may be taken, if desired, as an indication of the surface hardness of the specimen. After such gauge reading has been noted, the rim of the gauge is rotated by the operator to bring the zero point on the gauge dial into registration with the existing position of the pointer 62. The operator is then ready to proceed with the sub-surface hardness test.

By further rotation of the hand crank 27 the anvil and specimen are lifted, causing the spindle 15 to be also moved upwardly, which results in the tapered surface 50 of the spindle engaging the taper 52 of the weight 41. When this occurs the weight 41 is lifted by the spindle as a result of the force being transmitted through the anvil, specimen and penetrator. The picking up of the weight 41 by the test spindle results in the load of the weight being applied to the penetrator, which causes the penetrator to be pressed further into the specimen. The movement of the penetrator into the specimen while the gauge support is resting thereon, results in relative movement between the spindle and the gauge support. This relative movement allows the gauge spindle 63 to move outwardly with corresponding rotation of the pointer 62. When the load of the weight 41 has been fully applied and the pointer of the gauge comes to rest, the operator notes the reading of the gauge which is an indication of the sub-surface hardness of the specimen. After such reading has been noted, the hand crank 27 may be rotated in the reverse direction to lower the anvil 19, which allows the weight 41 to again rest upon the table 28 of the frame and permits the specimen to move out of engagement with the penetrator and the gauge support so that it can be removed from the testing machine.

It is important in making the hardness test just described, that the weight 41 be not suddenly picked up by the test spindle because this would result in a sudden application of the major test load to the penetrator and would prevent an accurate test being made. To prevent the possibility of such sudden application of the major load, I provide retarding means which is not within the control of the operator of the machine. As a suitable retarding means for this purpose, I may provide a spring 70 between the anvil and the screw 18, and through which spring the lifting force must be transmitted. If desired, the anvil may be of hollow construction with the upper end of the screw 18 slidably extending thereinto. The spring may be disposed in the recess of the anvil with the ends of the spring bearing respectively against the anvil and the screw, as shown in Fig. 3. When the lifting of the anvil and the test piece causes the spindle 15 to engage the weight 41, the spring 70 will be deflected as the load of the weight is picked up and the deflecting of the spring will therefore regulate the rate of application of the major load.

From the foregoing description and accompanying drawings, it will now be understood that I have provided a greatly simplified and very compact form of hardness testing machine, wherein a test load of definite value is obtained from a weighted spindle and an increased test load of definite value is obtained by causing a gravity weight to be directly engaged and lifted by the spindle. It will be understood further that I have provided novel mounting means for the weighted spindle whereby straight line and substantially frictionless movement of the spindle is obtained. The improved testing machine which I have provided permits of accurate hardness tests being rapidly made on individual bodies without the usefulness of the bodies being impaired or destroyed.

While I have illustrated and described the improved testing machine of my invention in a somewhat detailed manner, it will be understood of course that I do not wish to be limited to the precise details of construction and arrangement of parts herein disclosed but regard the invention as including such changes and modifications as do not involve a departure from the spirit of the invention and the scope of the appended claims.

Having thus described my invention I claim:

1. In testing apparatus the combination of a frame having thereon a test member and an anvil member movable relative to the frame and to each other, operating means for moving the anvil member toward the test member as a part of each test being made, a penetrator associated with one of said members for engagement with a specimen received therebetween, a weight having its gravity load normally supported on said frame by direct engagement of the weight with a portion of the frame, and means providing a lost motion connection between said test member and said weight whereby the latter may be directly lifted by force supplied by such movement of the anvil and transmitted through the specimen and penetrator.

2. In a testing machine, the combination of a frame, a weighted test spindle movable in said frame, a penetrator on said spindle, a movable gauge support adjacent the penetrator and adapted to rest upon the specimen being tested, a gauge on said support, means for actuating said gauge in response to relative movement between said spindle and said gauge support, and means for bringing a specimen into lifting engagement with said gauge support and said weighted spindle whereby the load of the latter presses the penetrator into the specimen.

3. In a testing machine, the combination of a frame, a spindle member movable in said frame, a supporting member on said frame, a penetrator associated with one of said members for engagement with a specimen, said spindle member being weighted to provide a minor load for pressing the penetrator into a specimen and said supporting member being movable for bringing the specimen into lifting engagement with the weighted spindle, a weight normally supported on the frame and adapted to be lifted by said spindle for applying additional test load to the penetrator, and operating means cooperating with said supporting member for causing such movement thereof as a part of each test being made.

4. In a testing machine, the combination of a frame, a spindle movable in said frame, a penetrator on said spindle, said spindle having an increased body of metal therein providing a minor test load, a gravity weight normally supported directly on the frame and adapted to provide a major test load, and means for bringing a specimen into lifting engagement with said spindle and said spindle into lifting engagement with said gravity weight comprising a movable anvil and manually controlled operating means for causing upward movement of the anvil as a part of each test being made.

5. In a testing machine, the combination of a frame, a spindle movable in said frame, a penetrator on said spindle, said spindle having an increased body of metal therein providing a minor test load, a gravity weight normally supported on the frame and adapted to provide a major test load, means providing a lost motion connection between said spindle and said gravity weight, a movable anvil for bringing a specimen into lifting engagement with said spindle and said spindle into lifting engagement with said gravity weight, a screw supporting said anvil, a nut rotatably mounted on said frame and cooperating with said screw, and drive means for causing rotation of said nut as a part of each test being made.

6. In a testing machine, the combination of a frame, a test spindle, a penetrator on said spindle, a movable support for bringing a specimen into lifting engagement with said penetrator and spindle, a gravity weight normally supported on the frame and adapted to be directly engaged and lifted by the spindle for supplying a desired test load, and means mounting said spindle for movement on the frame comprising substantially parallel strips of flexible metal having their respective ends connected with said spindle and said frame.

7. In a testing machine, the combination of a frame having thereon a movable support and a movable spindle, a penetrator for engagement with a specimen received between said spindle and support, a body of metal providing a direct acting gravity load for said spindle, and means for actuating said movable support to cause said gravity load to press the penetrator into the specimen including a spring through which actuating force is transmitted, said spring being adapted to be deflected by an actuating force equivalent to said gravity load whereby a substantially uniform rate of application of the load to the penetrator is obtainable during successive tests.

8. In a testing machine, the combination of a frame, a spindle movable in said frame, a penetrator on said spindle, said spindle having an increased body of metal providing a minor test load, a gravity weight normally supported on the frame and adapted to provide a major test load, means providing a lost motion connection between said spindle and said gravity weight, a movable gauge support adjacent the penetrator adapted to rest upon the specimen being tested, a gauge on said support, and a movable anvil for bringing a specimen into lifting engagement with said spindle and said gauge support and said spindle into lifting engagement with said gravity weight.

JOSEPH GOGAN.